United States Patent [19]

Gibler et al.

[11] Patent Number: 5,162,446

[45] Date of Patent: Nov. 10, 1992

[54] DEPOLYMERIZATION OF CONJUGATED DIENE POLYMERS

[75] Inventors: Carma J. Gibler, Houston; Linda R. Chamberlain, Richmond; Richard A. Kemp, Stafford; Stanley E. Wilson, Houston, all of Tex.

[73] Assignee: Shell Oil Company, Houston, Tex.

[21] Appl. No.: 785,114

[22] Filed: Oct. 30, 1991

[51] Int. Cl.$^5$ ............................................. C08F 8/50
[52] U.S. Cl. .................................. 525/338; 525/332.8; 525/332.9; 525/333.1; 525/333.2; 525/370
[58] Field of Search ................................. 525/320, 338

[56] References Cited

U.S. PATENT DOCUMENTS

| | | | |
|---|---|---|---|
| 3,917,576 | 11/1975 | Uraneck et al. | 260/94.7 D |
| 3,995,095 | 11/1976 | Short | 526/48 |
| 4,038,228 | 7/1977 | Taylor | 260/23 |
| 4,072,807 | 2/1978 | Uraneck et al. | 526/48.1 |
| 4,495,311 | 1/1985 | Hudgin et al. | 523/126 |
| 4,501,857 | 2/1985 | Kishimoto et al. | 525/338 |

FOREIGN PATENT DOCUMENTS

| | | |
|---|---|---|
| 0339986 | 11/1989 | European Pat. Off. . |
| 1273819 | 7/1968 | Fed. Rep. of Germany . |
| 62-209102 | 9/1987 | Japan . |
| 62-209103 | 9/1987 | Japan . |

*Primary Examiner*—Bernard Lipman
*Attorney, Agent, or Firm*—Donald F. Haas

[57] ABSTRACT

This is a process for the depolymerization of conjugated diene polymers which comprises contacting the polymers with hydrogen in the presence of at least one bis(cyclopentadienyl)zirconium compound.

9 Claims, No Drawings

DEPOLYMERIZATION OF CONJUGATED DIENE POLYMERS

BACKGROUND OF THE INVENTION

This invention relates to the degradation of conjugated diene polymers or copolymers to lower molecular weight materials. More particularly, the invention relates to the use of certain zirconium compounds in the degradation of such polymers.

Polymers of conjugated dienes and/or block copolymers of vinyl aromatic hydrocarbons and conjugated dienes are well known and have been used for many years for many purposes. Such polymers, particularly if saturated, are relatively stable materials. Thus, it would be advantageous to provide a means to break down or degrade these polymers more quickly than by natural means if necessary. This may be useful for rubber waste management, to produce precursor polymers to undergo further reactions such as functionalization or to prepare a polymer "blend" having certain unique properties.

SUMMARY OF THE INVENTION

Depolymerization (degradation) of the conjugated diene polymer is carried out in the presence of at least one bis(cyclopentadienyl)zirconium compound preferably of the formula:

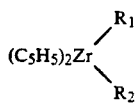

wherein $R_1$ and $R_2$ are the same or different and are selected from the group consisting of hydrogen, halogen groups, $C_1$-$C_8$ alkyl and alkoxy groups, $C_6$-$C_8$ aryloxy groups, aralkyl, cycloalkyl groups, silyl groups and carbonyl groups. The degradation step may be carried out in the presence of a promoter such as lithium hydride.

DETAILED DESCRIPTION OF THE INVENTION

As is well known, polymers containing both aromatic and ethylenic unsaturation can be prepared by copolymerizing one or more polyolefins, particularly a diolefin, by themselves or with one or more alkenyl aromatic hydrocarbon monomers. The polymers may, of course, be random, tapered, block or a combination of these, as well as linear, star or radial.

As is well known, polymers containing ethylenic unsaturation or both aromatic and ethylenic unsaturation may be prepared using anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an anionic polymerization initiator such as Group IA metals, their alkyls, amides, silanolates, napthalides, biphenyls and anthracenyl derivatives. It is preferred to use an organoalkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organolithium compounds having the general formula:

$$RLi_n$$

Wherein:
R is an aliphatic, cycloaliphatic, aromatic or alkyl-substituted aromatic hydrocarbon radical having from 1 to about 20 carbon atoms; and n is an integer of 1 to 4.

Conjugated diolefins which may be polymerized anionically include those conjugated diolefins containing from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Conjugated diolefins containing from 4 to about 8 carbon atoms are preferred for use in such polymers. Alkenyl aromatic hydrocarbons which may be copolymerized include vinyl aryl compounds such as styrene, various alkyl-substituted styrenes, alkoxy-substituted styrenes, 2-vinyl pyridine, 4-vinyl pyridine, vinyl naphthalene, alkyl-substituted vinyl naphthalenes and the like.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; linear and cyclic ethers such as methyl ether, methyl ethyl ether, diethyl ether, tetrahydrofuran and the like.

Conjugated diolefin-alkenyl aromatic copolymers which may be used in the present invention include those copolymers described in U.S. Pat. Nos. 3,135,716; 3,150,209; 3,496,154; 3,498,960; 4,145,298 and 4,238,202, the disclosure of which patents are herein incorporated by reference. Conjugated diolefin-alkenyl aromatic hydrocarbon copolymers which may be used in this invention also include block copolymers such as those described in U.S. Pat. Nos. 3,231,635; 3,265,765 and 3,322,856, the disclosure of which patents are also incorporated herein by reference. In general, linear and branched block copolymers which may be used in the present invention include those which may be represented by the general formula:

$$A_x\text{-}(B\text{-}A)_y\text{-}B_x$$

Wherein:
A is a linear or branched polymeric block comprising predominantly monoalkenyl aromatic hydrocarbon monomer units;

B is a linear or branched polymeric block containing predominantly conjugated diolefin monomer units;

x and z are, independently, a number equal to 0 or 1;

y is a whole number ranging from 0 to about 15, and the sum of $x+z+y \leq 2$.

Polymers which may be treated in accordance with this invention also include coupled and radial block copolymers such as those described in U.S. Pat. Nos. 4,033,888; 4,077,893; 4,141,847; 4,391,949 and 4,444,953, the disclosure of which patents are also incorporated herein by reference.

Other types of polymers may also be depolymerized with the process of the present invention. These include any polymers that contain olefinic unsaturation such as random styrene-butadiene polymers.

When the polymerization is complete, it is advantageous to terminate the living polymer to prevent it from reacting during further processing. This termination can be carried out by the use of alcohols. More recently, it has been found that hydrogen can be used to provide an improved means for terminating the living polymer. When this improvement is used, the problems of using alcohol, i.e. the formation of lithium alkoxides and excess alcohol impurities, are avoided. These impurities can be detrimental to solvent recycle streams, waste streams and potentially cause product performance problems.

As stated above, the degradation process is carried out in the presence of a bis(cyclopentadienyl)zirconium compound of the formula:

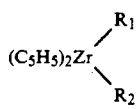

wherein $R_1$ and $R_2$ are the same or different and are selected from the group consisting of hydrogen, halogen groups, $C_1$-$C_8$ alkyl and alkoxy groups, $C_6$-$C_8$ aryloxy groups, aralkyl, cycloalkyl groups, silyl groups and carbonyl groups.

Specific bis(cyclopentadienyl) compounds which may be used in the present invention include bis(cyclopentadienyl)zirconium dichloride, bis(cyclopentadienyl)zirconium dihydride, bis(cyclopentadienyl)zirconium hydridochloride, bis(cyclopentadienyl)zirconium dibromide, bis(cyclopentadienyl)zirconium diiodide, bis(cyclopentadienyl)zirconium difluoride, bis(cyclopentadienyl)zirconium dicarbonyl, bis(cyclopentadienyl)zirconium dimethyl, bis(cyclopentadienyl)zirconium diethyl, bis(cyclopentadienyl)zirconium dibutyl (including n-butyl, sec-butyl, tert-butyl), bis(cyclopentadienyl)zirconium bis(trimethylsilylmethyl), bis(cyclopentadienyl)zirconium dibenzyl, bis(cyclopentadienyl)zirconium dihexyl, bis(cyclopentadienyl)zirconium dimethoxide, bis(cyclopentadienyl)zirconium diethoxide, bis(cyclopentadienyl)zirconium dibutoxide, bis(cyclopentadienyl)zirconium dipentoxide, bis(cyclopentadienyl)zirconium dineopentoxide, bis(cyclopentadienyl)zirconium diphenoxide, and all mixtures thereof. The preferred zirconium compound is bis(cyclopentadienyl)zirconium dichloride because of ease of handling, relative insensitivity to air and moisture, low cost and commercial availability.

This process will degrade these polymers to low molecular weight polystyrene and diene polymers without hydrogenating them to any significant degree. Degradation of greater than 80% is easily obtained and it has been found that degradation of almost 100% can be achieved. In some cases, it may be necessary to use a promoter to increase the degradation. Such promoters include alkyl metal compounds, such as sec-butyl and n-butyl lithium, and metal hydrides, such as lithium hydride. Lithium hydride is preferred because it is more reactive with the zirconium compounds which results in faster and more complete degradation and it is easily formed during hydrogen termination of the polymerized living ends.

In general, the degradation is carried out in a suitable solvent at a temperature within the range of from about 0° to about 120° C., preferably about 60° to about 90° C., and at a hydrogen partial pressure within the range from about 1 psig to about 1200 psig, preferably from about 100 to about 200 psig. Catalyst concentrations within the range from about 0.01 mM(millimoles) per 100 grams of polymer to about 20 mM per 100 grams of polymer, preferably 0.04 to 1 mM catalyst per 100 grams of polymer, are generally used and contacting at degradation conditions is generally continued for a period of time within the range from about 30 to about 360 minutes. Suitable solvents for degradation include, among others, n-heptane, n-pentane, tetrahydrofuran, cyclohexane, toluene, hexane and benzene. Because of the small amount of catalyst present in the polymer after degradation, it is not necessary to separate the catalyst and catalyst residue from the polymer after degradation. However, if separation is desired, it may be carried out using methods well known in the prior art. The degradation may be carried out in other manners such as batch processes, continuous processes, and semi-continuous processes. The catalyst and promoters may also be mixed with the solvent-free polymer by grinding or other methods, then exposed to hydrogen gas and heat to degrade the polymer.

EXAMPLES

Polystyrene-polybutadiene-polystyrene and polyisoprene-polystyrene block copolymers were produced via anionic polymerization and terminated with either methanol or hydrogen. In the case of hydrogen termination, lithium hydride is formed. In the case of methanol termination, lithium methoxide is formed. In some cases, a promoter (sec-butyllithium) was added to the polymer solution. The reactor was pressured up to 500 psig to 750 psig hydrogen pressure or 60 psig nitrogen pressure. The zirconium catalyst was added to the polymer solution and the temperature were controlled between 40°-90° C. After reaction times of 180-250 minutes, the polymer solutions were analyzed by ozone titration of the carbon-carbon double bonds and then by gel permeation chromatography (GPC). The ozone titration results indicated that the polymers were degraded because the double bond concentration decreased. Degradation of the polymer into low molecular weight diene and polystyrene species was determined by the GPC and confirmed by the absence of the main peak characteristic of the block copolymer. If only the concentration of the carbon-carbon double bonds were monitored, then the results could be incorrectly interpreted as hydrogenation of the polymer since a decrease in carbon-carbon double bonds also occurs during hydrogenation. The molecular integrity of the polymer is retained during hydrogenation.

EXAMPLE 1

Preparation of Hydrogen-Terminated S—B—S Polymer, 44.1M Molecular Weight

A 600 lb. batch of polystyrene-polybutadiene-polystyrene (S—B—S—Li+) block copolymer 44,100 molecular weight was made by anionic polymerization using sec-butyllithium as the initiator in a 150 gallon pressurized reactor. The polymerization took place in a mixture of cyclohexane and diethyl ether. The resulting polymer solution contained 20% polymer by weight. At the end of the polymerization reaction, the reactor was sparged with hydrogen and vigorously mixed for approximately 15 minutes to terminate the polymer and form a lithium hydride by-product.

EXAMPLE 2

Preparation of Hydrogen-Terminated S—B—S Polymer, 58M Molecular Weight

A 600 lb. batch of polystyrene-polybutadiene-polystyrene (S—B—S—Li+) block copolymer 58,000 molecular weight was made by anionic polymerization using sec-butyllithium as the initiator in a 150 gallon pressurized reactor. The polymerization took place in a mixture of cyclohexane and diethyl ether. The resulting polymer solution contained 20% polymer by weight. At the end of the polymerization reaction, the reactor was sparged with hydrogen and vigorously mixed for approximately 30 minutes to terminate the polymer and form a lithium hydride by-product.

EXAMPLE 3

Preparation of Methanol-Terminated S-B-S Polymer, 55.6M Molecular Weight

A 600 lb. batch of polystyrene-polybutadiene-polystyrene (S-B-S-Li+) block copolymer 55,600 molecular weight was made by anionic polymerization using sec-butyllithium as the initiator in a 150 gallon pressurized reactor. The polymerization took place in a mixture of cyclohexane and diethyl ether. The resulting polymer solution contained 20% polymer by weight. At the end of the polymerization reaction, the polymer was terminated with a 1.35 molar ratio of methanol:Li which produced lithium methoxide and residual methanol in the polymer solution.

EXAMPLE 4

Preparation of Methanol-Terminated I-S Polymer, 97.6M Molecular Weight

A 600 lb. batch of polyisoprene-polystyrene (I-S-Li+) block copolymer 97,600 molecular weight was made by anionic polymerization using sec-butyllithium as the initiator in a 150 gallon pressurized reactor. The polymerization took place in cyclohexane and the resulting polymer solution contained 15% polymer by weight. At the end of the polymerization reaction, a 1.33 methanol:Li molar ratio was added to the polymer solution which produced lithium methoxide and excess methanol in the polymer solution.

EXAMPLE 5

Degradation Using $Cp_2ZrCl_2$ Catalyst in Hydrogen Atmosphere

A hydrogen-terminated polystyrene-polybutadiene-polystyrene type polymer of 44,100 molecular weight was prepared as in Example 1. Approximately 1560 g of the 20% polymer by weight solution containing LiH was pressure-transferred to a 4-liter reactor. The temperature of the reactor was maintained at 80° C. The reactor was pressurized to 500 psig with hydrogen gas. At this time, 0.0025 g-moles of the bis(cyclopentadienyl)zirconium dichloride ($Cp_2ZrCl_2$) was added to the reactor as a cyclohexane slurry. The reaction was allowed to run for 180 minutes. Gel permeation chromatography (GPC) was done on the final samples and 100% of the polymer had degraded into much lower weight diene and polystyrene blocks distributed around the peak molecular weight of 6400.

EXAMPLE 6

Degradation Using $Cp_2ZrCl_2$ Catalyst in Nitrogen Atmosphere

A hydrogen-terminated polystyrene-polybutadiene-polystyrene type polymer of 58,000 molecular weight was prepared as in Example 2. Approximately 1560 g of the 20% polymer containing LiH by weight solution was pressure-transferred to a 4-liter reactor. The temperature of the reactor was maintained at 80° C. The reactor was pressurized to 60 psig with nitrogen gas. At this time, 0.0025 g-moles of the bis(cyclopentadienyl)zirconium dichloride ($Cp_2ZrCl_2$) was added to the reactor as a cyclohexane slurry. The reaction was allowed to run for 180 minutes. Ozone titration results showed that degradation was <20%. Gel permeation chromatography (GPC) was done on the final samples and less than 20% of the polymer had degraded. Comparison of Example 6 with Example 5 shows that a hydrogen atmosphere promotes degradation of the polymer versus an inert (nitrogen) atmosphere.

EXAMPLE 7

Degradation Using $Cp_2ZrHCl$ Catalyst in Hydrogen Atmosphere

A methanol-terminated polystyrene-polybutadiene-polystyrene type polymer of 55,600 molecular weight was prepared as in Example 3. Approximately 390 g of the 20% polymer by weight solution and 1170 g of cyclohexane were pressure-transferred to a 4-liter reactor. The resulting solution was 5% polymer by weight. The solution was sparged with hydrogen for approximately one hour. Sec-butyllithium (0.0702 g-moles) was added to the solution. The initial temperature was 40° C. and the hydrogen pressure was raised to 750 psig. At this time, 0.0061 g-moles of the catalyst, bis(cyclopentadienyl)zirconium hydridochloride ($Cp_2ZrHCl$), was added. Immediately following catalyst addition, the temperature was raised to 60° C. The temperature was raised to 80° C. after 30 minutes of reaction. At 90 minutes of reaction, the temperature was raised to 90° C. The total reaction time was 180 minutes. Ozone titration showed that 49% of the double bonds degraded. Gel permeation chromatography (GPC) was done on the final samples and 85% of the polymer had degraded.

EXAMPLE 8

Degradation Using $Cp_2ZrH_2$ Catalyst in Hydrogen Atmosphere

A methanol-terminated polystyrene-polybutadiene-polystyrene type polymer of 55,600 molecular weight was prepared as in Example 3. Approximately 390 g of the 20% polymer by weight solution and 1170 g of cyclohexane were pressure-transferred to a 4-liter reactor. The resulting solution was 5% polymer by weight. The solution was sparged with hydrogen for approximately one hour.

The initial temperature was 40° C. and the hydrogen pressure was raised to 750 psig. At this time, 0.0027 g-moles of the catalyst, bis(cyclopentadienyl)zirconium dihydride ($Cp_2ZrH_2$), was added. Immediately following catalyst addition, the temperature was raised to 60° C. The temperature was raised to 80° C. after 30 minutes of reaction. At 90 minutes of reaction, the temperature was raised to 90° C. The total reaction time was 250 minutes. Ozone titration showed that 89% of the double bonds degraded. Gel permeation chromatography (GPC) was done on the final samples and 100% of the polymer had degraded.

EXAMPLE 9

Degradation Using $Cp_2ZrHCl$ Catalyst in Hydrogen Atmosphere

A methanol-terminated polyisoprene-polystyrene type polymer of 97,600 molecular weight was prepared as in Example 4. Approximately 520 g of the 15% polymer by weight solution and 1040 g of cyclohexane were pressure-transferred to a 4-liter reactor. The resulting solution was 5% polymer by weight. The solution was sparged with hydrogen for approximately one hour. The initial temperature was 40° C. and the hydrogen pressure was raised to 750 psig. At this time, 0.0014 g-moles of the catalyst, bis(cyclopentadienyl)zirconium hydridochloride ($Cp_2ZrHCl$), was added. Immediately following catalyst addition, the temperature was raised to 60° C. The temperature was raised to 80° C. after 30 minutes of reaction. At 90 minutes of reaction, the temperature was raised to 90° C. The total reaction time was 180 minutes. Ozone titration showed that 16% of the double bonds degraded. Gel permeation chromatography (GPC) was done on the final samples and less than 20% of the polymer had degraded. This catalyst was effective in Example 7 when used with a sec-butyllithium promoter.

EXAMPLE 10

Degradation Using $Cp_2ZrH_2$ Catalyst in Hydrogen Atmosphere

A methanol-terminated polyisoprene-polystyrene type polymer of 97,600 molecular weight was prepared as in Example 4. Approximately 520 g of the 15% polymer by weight solution and 1040 g of cyclohexane were pressure-transferred to a 4-liter reactor. The solution was sparged with hydrogen for approximately one hour.

The initial temperature was 40° C. and the hydrogen pressure was raised to 750 psig. At this time, 0.0014 g-moles of the catalyst, bis(cyclopentadienyl)zirconium dihydride ($Cp_2ZrH_2$), was added. Immediately following catalyst addition, the temperature was raised to 60° C. The temperature was raised to 80° C. after 30 minutes of reaction. At 90 minutes of reaction, the temperature was raised to 90° C. The total reaction time was 180 minutes. Ozone titration showed that 29% of the double bonds degraded. Gel permeation chromatography (GPC) was done on the final samples and 100% of the polymer had degraded.

Others have used zirconium catalysts and claimed good hydrogenation results. We have found that this is not the case. We believe the confusion involves the interpretation of the disappearance of the carbon-carbon double bonds. In hydrogenation, carbon-carbon double bonds disappear due to saturation of these carbon-carbon bonds with hydrogen. In degradation, carbon-carbon double bonds disappear because the bonds are broken as the polymer molecules are fragmented or degraded. Methods to monitor the disappearance of these double bonds are employed in hydrogenation. This includes IR or NMR or ozone titration. If only the disappearance of double bonds were monitored, then the hydrogenation could be incorrectly concluded. Rather, degradation probably occurred.

During the evaluation of these Zr catalysts, ozone titration of the carbon-carbon double bond was the lab-scale method to monitor hydrogenation. As can be seen from the following table, it appears that hydrogenation of the polymer occurred:

TABLE 1

| Example 6: | 0% conversion |
|---|---|
| Example 7: | 49.4% conversion |
| Example 8: | 89.1% conversion |
| Example 9: | 16.5% conversion |
| Example 10: | 29.4% conversion |

If this were our only method to determine hydrogenation, we may have incorrectly concluded that hydrogenation, although poor, did occur in most cases. We tried drying the material by solvent casting and discovered that the polymer would not dry in the typical time. It would not dry at longer drying times. This raised our suspicions and we submitted the samples for GPC. GPC showed that the main polymer peak had indeed degraded. The disappearance of the carbon-carbon double bonds was due to degradation, not hydrogenation.

We claim:

1. A process for the degradation of a conjugated diene polymer which comprises contacting the polymer with hydrogen in the presence of at least one bis(cyclopentadienyl)zirconium compound of the formula:

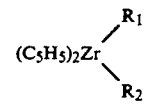

wherein $R_1$ and $R_2$ are the same or different and are selected from the group consisting of hydrogen, halogen groups, $C_1$–$C_8$ alkyl and alkoxy groups, $C_6$–$C_8$ aryloxy groups, aralkyl, cycloalkyl groups, silyl groups and carbonyl groups.

2. The process of claim 1 wherein the degradation is carried out at a temperature from about 0° C. to about 120° C. and a pressure of from about 1 psig to about 1200 psig and the catalyst concentration is from about 0.01 mM to about 20 mM of zirconium per 100 g of polymer and the contacting takes place for a period of time within the range from about 15 to about 1440 minutes.

3. The process of claim 2 wherein a promoter is used.

4. The process of claim 3 wherein the degradation is carried out at a temperature from about 60°–90° C. and a pressure from about 100–200 psig, the catalyst concentration is from about 0.04–1.0 mM zirconium per 100 g of polymer, the promoter to zirconium molar ratio is from about 3–30 and the contacting takes place for a period of time from about 30 to 360 minutes.

5. The process of claim 1 wherein the zirconium compound is selected from the group consisting of bis(- cyclopentadienyl)zirconium dichloride, bis(cyclopentadienyl)zirconium dihydride, bis(cyclopentadienyl)zirconium hydridochloride, bis(cyclopentadienyl)zirconium dibromide, bis(cyclopentadienyl)zirconium diiodide, bis(cyclopentadienyl)zirconium difluoride, bis(cyclopentadienyl)zirconium dicarbonyl, bis(cyclopentadienyl)zirconium dimethyl, bis(cyclopentadienyl)zirconium diethyl, bis(cyclopentadienyl)zirconium dibutyl (including n-butyl, sec-butyl, tertbutyl), bis(cyclopentadienyl)zirconium bis(trimethylsilylmethyl), bis(cyclopentadienyl)zirconium dibenzyl, bis(cyclopentadienyl)zirconium dihexyl, bis(cyclopentadienyl)zirconium dimethoxide, bis(cyclopentadienyl)zirconium diethoxide, bis(cyclopentadienyl)zirconium dibutoxide, bis(cyclopentadienyl)zirconium dipentoxide, bis(cyclopentadienyl)zirconium dineopentoxide, bis(cyclopentadienyl)zirconium diphenoxide, and all mixtures thereof.

6. The process of claim 5 wherein the zirconium compound is bis(cyclopentadienyl)zirconium dichloride.

7. The process of claim 5 wherein the zirconium compound is bis(cyclopentadienyl)zirconium dihydride.

8. The process of claim 5 wherein the zirconium compound is bis(cyclopentadienyl)zirconium hydridochloride.

9. The process of claim 1 wherein the polymers are copolymers of at least one conjugated diolefin and at least one vinyl aromatic hydrocarbon.

* * * * *